United States Patent
Shigeno

(10) Patent No.: US 9,948,800 B2
(45) Date of Patent: Apr. 17, 2018

(54) IMAGE SCANNER

(71) Applicant: BROTHER KOGYO KABUSHIKI KAISHA, Nagoya-shi, Aichi-ken (JP)

(72) Inventor: Hiroaki Shigeno, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/437,061

(22) Filed: Feb. 20, 2017

(65) Prior Publication Data
US 2017/0244849 A1  Aug. 24, 2017

(30) Foreign Application Priority Data
Feb. 24, 2016  (JP) ................. 2016-033512

(51) Int. Cl.
*H04N 1/04* (2006.01)
*H04N 1/00* (2006.01)
*H04N 1/10* (2006.01)

(52) U.S. Cl.
CPC ..... *H04N 1/00559* (2013.01); *H04N 1/00557* (2013.01); *H04N 1/10* (2013.01); *H04N 1/1026* (2013.01); *H04N 1/1043* (2013.01); *H04N 2201/0081* (2013.01); *H04N 2201/0094* (2013.01)

(58) Field of Classification Search
CPC .. H04N 1/00559; H04N 1/00557; H04N 1/10; H04N 1/1026; H04N 1/1043; H04N 2201/0081; H04N 2201/0094
USPC ........... 358/497, 474, 47, 505; 399/211, 212
See application file for complete search history.

(56) References Cited

U.S. PATENT DOCUMENTS

| | | | | |
|---|---|---|---|---|
| 5,966,147 A * | 10/1999 | Matsui | ................... | B41J 19/005 347/37 |
| 7,119,921 B2 * | 10/2006 | Kawasaki | ............... | B41J 19/20 347/32 |
| 8,218,204 B2 * | 7/2012 | Hozono | ................... | H04N 1/03 270/58.12 |
| 2006/0240924 A1 * | 10/2006 | Osakabe | ............... | B41J 19/005 474/117 |
| 2007/0126787 A1 * | 6/2007 | Naruse | .................... | B41J 19/20 347/37 |
| 2010/0128328 A1 * | 5/2010 | Hozono | ................... | H04N 1/03 358/474 |

FOREIGN PATENT DOCUMENTS

JP  2001-83627 A  3/2001

* cited by examiner

*Primary Examiner* — Cheukfan Lee
(74) *Attorney, Agent, or Firm* — Merchant & Gould P.C.

(57) ABSTRACT

An image scanner includes an image sensor with a plurality of scanning elements arrayed in a main scanning direction, a carriage carrying thereon the image sensor, a pair of pulleys, a belt looped around the pulleys, a connector, and a restricting member. The connector protrudes from the carriage and is connected to the belt which is inserted in an entry port of the connector. When the belt is driven to rotate, the connector moves with the belt and moves the carriage in a sub-scanning direction. The restricting member contacts the belt when, in a state where the carriage is at a standby position, the belt shifts in a disengaging direction in which the belt tends to disengage from the connector through the entry port.

10 Claims, 7 Drawing Sheets

IMAGE SCANNER

CROSS-REFERENCE TO RELATED APPLICATION

This application claims priority from Japanese Patent Application No. 2016-033512 filed on Feb. 24, 2016, the content of which is incorporated herein by reference in its entirety.

FIELD OF DISCLOSURE

Aspects disclosed herein relate to an image scanner.

BACKGROUND

A known flatbed image scanner includes a belt looped around a pair of pulleys and configured to reciprocate a carriage along a platen. The carriage includes a connector which is connected to a portion of the belt. When the belt is driven to rotate in a forward direction and in a reverse direction, the connector as well as the carriage moves reciprocally with the belt.

The connector of the known image scanner is connected to the belt by pinching opposite sides of the belt in a direction orthogonal to a direction in which the belt extends.

SUMMARY

It may be beneficial to provide an image scanner which comprises a restricting member configured to restrict disengagement of a belt from a connector when an excessive external force is applied to the belt.

According to one or more aspects of the disclosure, an image scanner comprises a support, an image sensor, a carriage, a motor, a pair of pulleys, a belt, a base, a connector, and a restricting member. The support has a support surface configured to support thereon an object to be scanned. The image sensor is configured to scan the object and includes a plurality of scanning elements arrayed in a main scanning direction. The carriage carries the image sensor thereon and is configured to reciprocate in a sub-scanning direction orthogonal to the main scanning direction and stand by at a standby position before and after the image sensor scans the object. The pair of pulleys are spaced apart from each other in the sub-scanning direction. Each pulley is rotatable, and one of the pulleys is configured to be driven to rotate by a driving force transmitted from the motor. The belt is disposed opposite to the support across a reciprocating space in which the carriage reciprocates. The belt is endless and looped around the pulleys, and configured to be driven to rotate by the driving force transmitted from the one of the pulleys. The base defines, between itself and the support, an accommodating space in which the image sensor, the carriage, the motor, the pulleys, and the belt are accommodated. The connector protrudes from the carriage and connected to the belt, and configured to, when the belt is driven to rotate, move with the belt and move the carriage. The connector has, at a protruding end thereof, an entry port and pinches opposite sides in the main scanning direction of the belt inserted in the entry port. The restricting member is configured to contact the belt when, in a state where the carriage is at the standby position, the belt shifts in a disengaging direction in which the belt tends to disengage from the connector through the entry port, whereby the restricting member restricts disengagement of the belt from the connector through the entry port.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Hereinafter, illustrative embodiments will be described with reference to the accompanying drawings.

(1) First Illustrative Embodiment

[Configuration of Multifunction Device]

Figure 1:
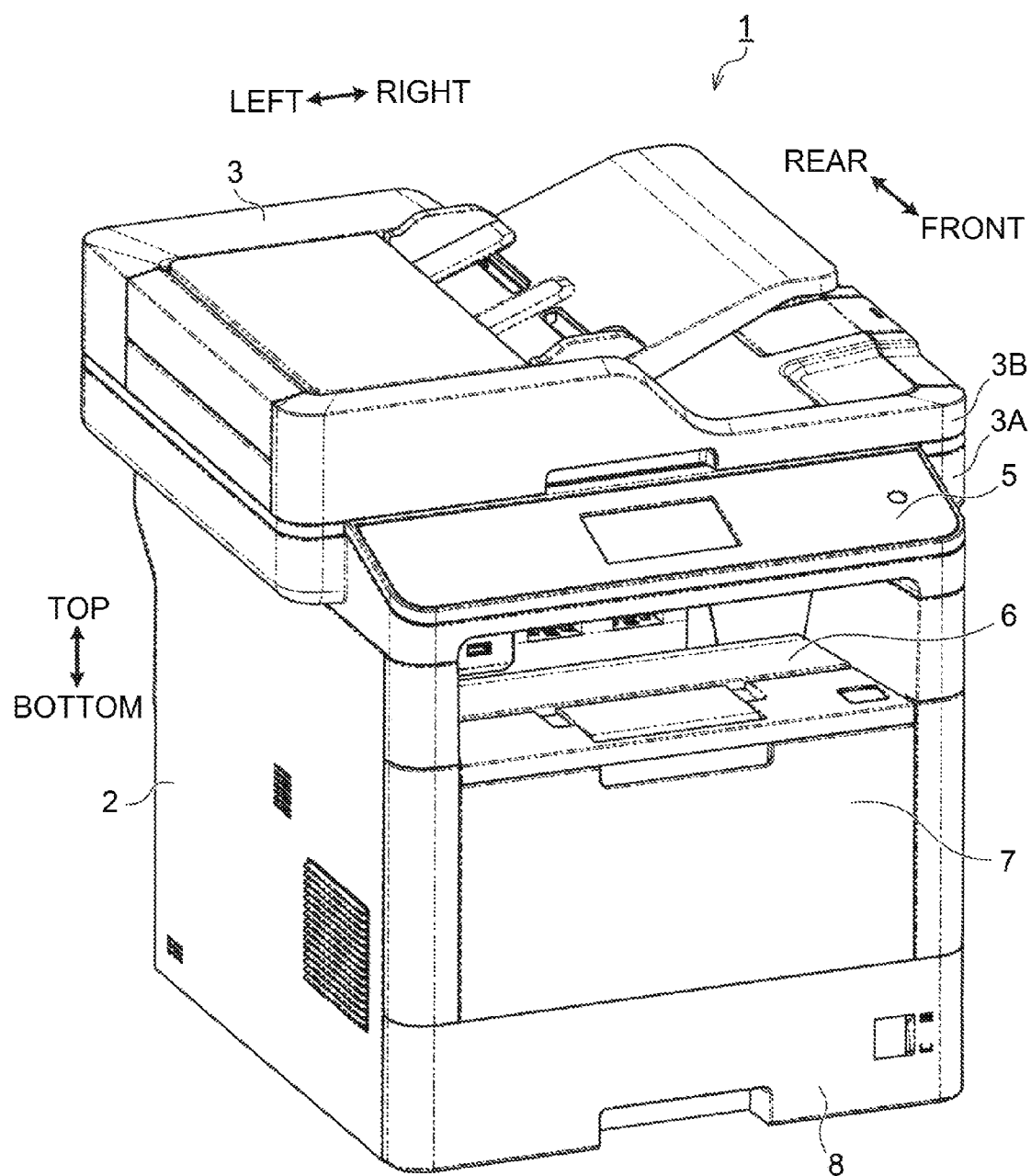
FIG. 1 is an external perspective view illustrating a multifunction device in a first illustrative embodiment according to one or more aspects of the disclosure.

A multifunction device 1 illustrated in FIG. 1 may include a configuration corresponding to an image scanner. Hereinafter, description will be made with reference to directions, e.g., top, bottom, right, left, front and rear, as shown in the drawing of FIG. 1 in order to explain relative positional relationships among each unit that the multifunction device 1 includes. As shown in FIG. 1, a top-bottom direction may be defined with reference to an orientation of the multifunction device 1 that may be disposed in an orientation in which it may be intended to be used. In other words, the top-bottom direction is orthogonal to the horizontal plane. A side of the multifunction device 1, in which an operation panel 5 may be provided, may be defined as the front of the multifunction device 1. A front-rear direction may be defined with reference to the front of the multifunction device 1. A right-left direction may be defined with respect to the multifunction device 1 as viewed from the front of the multifunction device 1.

As illustrated in FIG. 1, the multifunction device 1 includes a main unit 2 and a scanner 3. The scanner 3 is an example of the image scanner. The main unit 2 includes a controller, an image forming unit, and a LAN communication unit. The controller controls operation of the multifunction device 1. The scanner 3 includes a flatbed unit 3A and an automatic document feeder 3B. Hereinafter, the flatbed unit 3A is referred to as the FB unit 3A. "FB" stands for "flatbed" throughout the disclosure. The automatic document feeder 3B is referred to as the ADF 3B. "ADF" stands for "automatic document feeder" throughout the disclosure.

The multifunction device 1 includes the operation panel 5 at its front. The operation panel 5 enables a user to operate the multifunction device 1. The operation panel 5 includes an input device (e.g., a touch panel, buttons, and switches) and an output device (e.g., a liquid crystal display, and indicator lamps or lights). The input device enables the user to provide various instructions to the multifunction device 1. The output device enables the user to be notified of an operating status of the multifunction device 1.

The multifunction device 1 further includes a medium discharge tray 6 below the operation panel 5. The medium discharge tray 6 is configured to support one or more discharged recording media each having an image formed by the image forming unit. The multifunction device 1 further includes a front cover 7 below the medium discharge tray 6. The front cover 7 is openable and closable relative to the main unit 2. While the front cover 7 is opened, the user is enabled to access the image forming unit disposed inside the main unit 2 for maintenance. The opened front cover 7 may function as a medium feed tray for forming an image on a relatively-thick recording medium, e.g., thick paper or envelop. The multifunction device 1 further includes a medium feed cassette 8 below the front cover 7. The medium feed cassette 8 is configured to store one or more recording media to be fed to the image forming unit.

[Details of Scanner]

Hereinafter, a configuration of the scanner 3 will be described in detail. The scanner 3 includes a first image sensor 11A (as an example of an image sensor) and a second image sensor 11B. The first image sensor 11A is disposed at the FB unit 3A and the second image sensor 11B is disposed at the ADF 3B.

Each of the first image sensor 11A and the second image sensor 11B may be a linear image sensor including a plurality of scanning elements (not illustrated) arrayed linearly. In the first illustrative embodiment, each of the first image sensor 11A and the second image sensor 11B may be a contact image sensor. In each of the first image sensor 11A and the second image sensor 11B, the direction in which the scanning elements are arrayed (e.g., a main scanning direction) may correspond to a direction perpendicular to both the right-left direction and the top-bottom direction. That is, the main scanning direction corresponds to the front-rear direction.

The scanner 3 further includes an FB platen 12 (as an example of a support), a first ADF platen 13A, and a second ADF platen 13B. The FB platen 12 and the first ADF platen 13A are disposed at the FB unit 3A and the second ADF platen 13B is disposed at the ADF 3B. Each of the FB platen 12, the first ADF platen 13A, and the second ADF platen 13B may be a transparent plate, e.g., a glass plate or an acrylic plate. The FB platen 12 is configured to support a document on its support surface (as an example of an upper surface) that extends in both the front-rear direction and the right-left direction which are orthogonal to each other.

The FB unit 3A includes a guide shaft 14, a carriage 15, and a toothed belt 16 (as an example of a belt). The guide shaft 14 may be a round metal rod. The guide shaft 14 is disposed below and spaced from the FB platen 12. The guide shaft 14 extends in the right-left direction in FIG. 2. The carriage 15 is attached to and above the guide shaft 14. The carriage 15 is supported by the guide shaft 14 such that the carriage 15 is capable of reciprocating along the guide shaft 14 with respect to the right-left direction.

The carriage 15 reciprocates within a particular movable range with respect to the right-left direction. Hereinafter, a left limit of the movable range is referred to as a first position, and a right limit of the movable range is referred to as a second position. That is, the carriage 15 moves rightward from the first position to the second position and returns leftward from the second position to the first position with respect to the right-left direction. The toothed belt 16 is one of components constituting a driving mechanism for the carriage 15. The first image sensor 11A is mounted on the carriage 15 such that the scanning elements face the FB platen 12 and the first ADF platen 13A (e.g., the scanning elements face upward in FIG. 2).

The ADF 3B includes a presser 17. The presser 17 may be a laminated member of a resin foam layer and a hard resin film layer. In a state where the ADF 3B is completely closed, the presser 17 is slightly elastically deformed to tightly contact the FB platen 12. In a case where a document (as an example of an object to be scanned) is placed on the FB platen 12 in this state, the presser 17 presses the document toward the FB platen 12.

For scanning an image on a document (e.g., a sheet or a book) placed on the FB platen 12, the first image sensor 11A scans the image on the document while moving in a direction orthogonal to the scanning-element array direction (e.g., the main scanning direction) together with the carriage 15. While the carriage 15 moves from the first position to the second position (e.g., rightward in the first illustrative embodiment), the first image sensor 11A scans the image on the document supported by the FB platen 12 during a period in which the first image sensor 11A moves within an area where the first image sensor 11A faces the FB platen 12. After the first image sensor 11A completes the scanning of the image on the document, the carriage 15 moves back toward the first position. Upon arrival at the first position, the carriage 15 stops moving to complete the operation. Since then until the carriage 15 starts moving for the next operation, the carriage 15 is kept on standby at the first position. The first position corresponds to a standby position. The first image sensor 11A on the carriage 15 at the second position can scan a right limit of a maximum scanning range defined on the FB platen 12.

Figure 2:
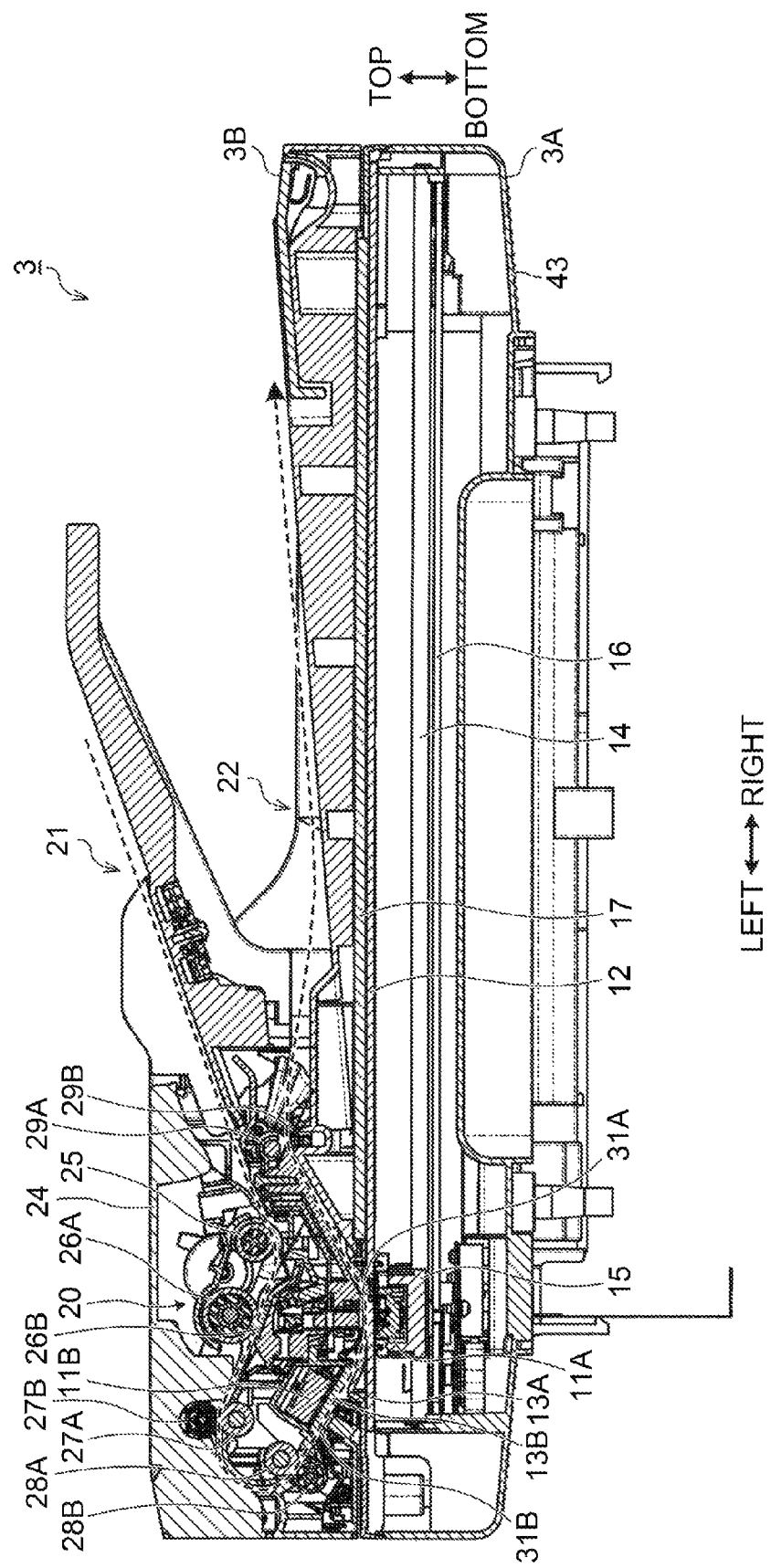
FIG. 2 is a central sectional view illustrating a scanner in the first illustrative embodiment according to one or more aspects of the disclosure.

As illustrated in FIG. 2, the ADF 3B of the scanner 3 includes a conveyor unit 20. The conveyor unit 20 is configured to convey a document sheet along a conveyance path (indicated by a dashed line). The ADF 3B further includes a document feed unit 21 disposed upstream of the conveyor unit 20 in the conveyance direction. The document feed unit 21 is configured to support one or more document sheets to be supplied to the conveyor unit 20. The ADF 3B further includes a document discharge unit 22 disposed downstream of the conveyor unit 20 in the conveyance direction. The document discharge unit 22 is configured to support one or more document sheets discharged thereonto by the conveyor unit 20.

The conveyor unit 20 includes a feed roller 25, a separation roller 26A, a separation member 26B, a first conveyor roller 27A, a first pinch roller 27B, a second conveyor roller 28A, a second pinch roller 28B, a discharge roller 29A, and a discharge pinch roller 29B. The first pinch roller 27B is urged toward the first conveyor roller 27A by a spring (not illustrated). The second pinch roller 28B is urged toward the second conveyor roller 28A by a spring (not illustrated). The discharge pinch roller 29B is urged toward the discharge roller 29A by a spring (not illustrated).

One or more document sheets placed on the document feed unit 21 are fed downstream in the conveyance direction from the document feed unit 21 by the feed roller 25, and are separated into one by cooperation of the separation roller 26A and the separation member 26B. The separated document sheet is conveyed further downstream in the conveyance direction by the first conveyor roller 27A and the second conveyor roller 28A, and is then discharged onto the document discharge unit 22 by the discharge roller 29A.

The first ADF platen 13A defines the lowest portion of the conveyance path. The conveyor unit 20 further includes a first document-pressing portion 31A opposite to the first ADF platen 13A. The first document-pressing portion 31A and the first ADF platen 13A define a portion of the conveyance path therebetween. The first document-pressing portion 31A faces the first ADF platen 13A from above. The second ADF platen 13B extends diagonally downward toward the first ADF platen 13A from the second conveyor roller 28A and defines an upper portion of the conveyance path. The conveyor unit 20 further includes a second document-pressing portion 31B opposite to the second ADF platen 13B. The second document-pressing portion 31B and the second ADF platen 13B define a portion of the conveyance path therebetween. The second document-pressing portion 31B faces the second ADF platen 13B from diagonally below.

The first document-pressing portion 31A is urged toward the first ADF platen 13A with an urging force that does not affect sheet conveyance. With this configuration, while a document sheet passes between the first ADF platen 13A and the first document-pressing portion 31A, the document sheet moving along the first ADF platen 13A may be kept in contact with an upper surface of the first ADF platen 13A.

The second document-pressing portion 31B is urged toward the second ADF platen 13B with an urging force that does not affect sheet conveyance. With this configuration, while a document sheet passes between the second ADF platen 13B and the second sheet pressing portion 31B, the document sheet moving along the second ADF platen 13B may be kept in contact with a lower surface of the second ADF platen 13B.

For scanning an image on a document sheet being conveyed by the conveyor unit 20, the carriage 15 stops at a stationary position at which the first image sensor 11A faces the first document-pressing portion 31A across the first ADF platen 13A. In this state, the first image sensor 11A scans the image on the document sheet that is passing in contact with the upper surface of the first ADF platen 13A. The stationary position is between the first position and the second position, that is, the stationary position is to the right of the first position. In other words, the first position (i.e., the standby position) is further to the left than the stationary position at which the carriage 15 stops for the first image sensor 11A to scan an image on a document sheet being conveyed by the conveyor unit 20. The second image sensor 11B is disposed opposite to the second document-pressing portion 31A across the second ADF platen 13B. The second image sensor 11B is configured to scan an image on a document sheet that is passing in contact with the lower surface of the second ADF platen 13B.

[Detailed Configuration of Restricting Member and its Surrounding Components]

Figure 3:
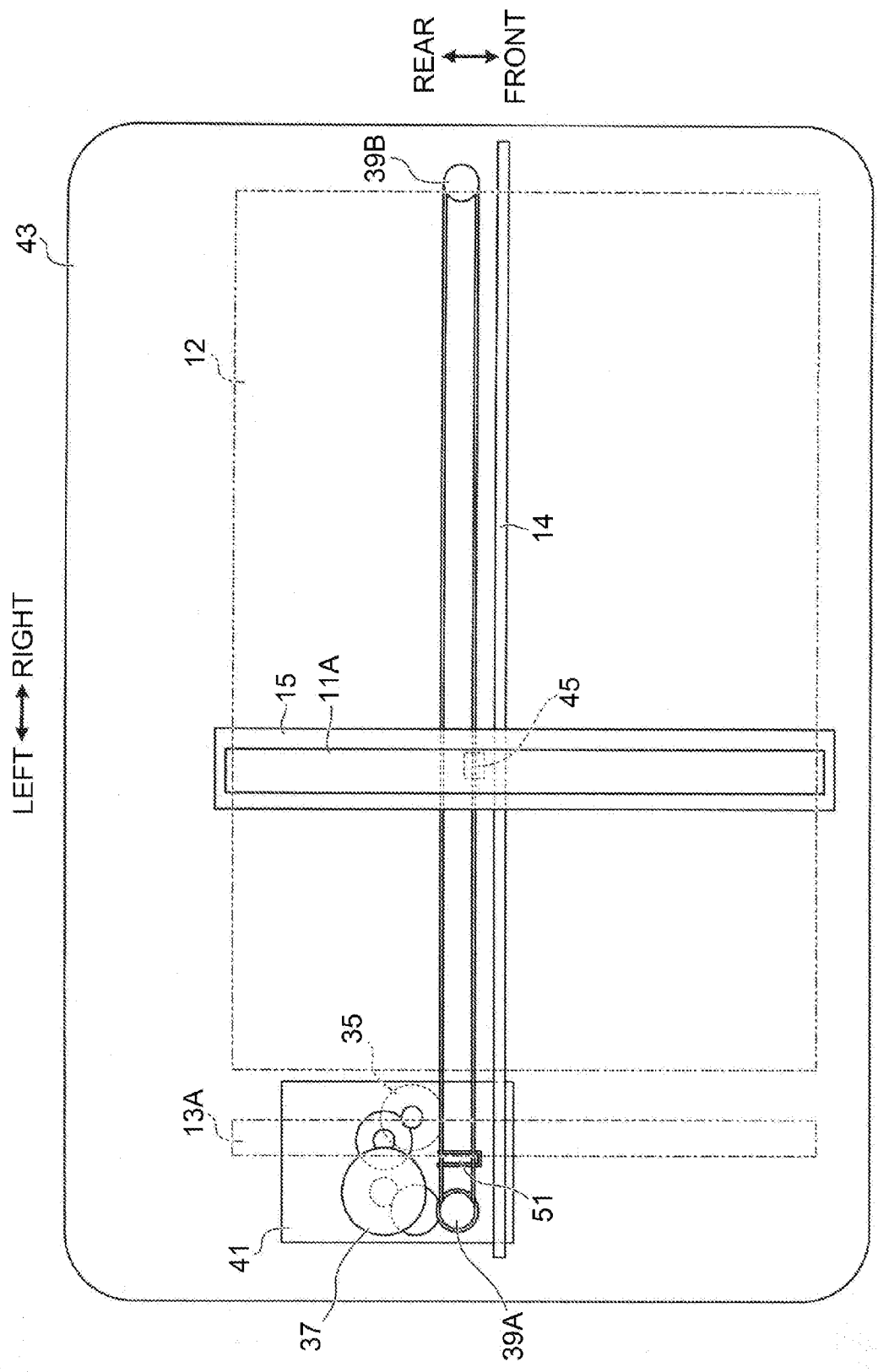
FIG. 3 is a schematic top plan view illustrating the scanner in the first illustrative embodiment according to one or more aspects of the disclosure.
Figure 4:
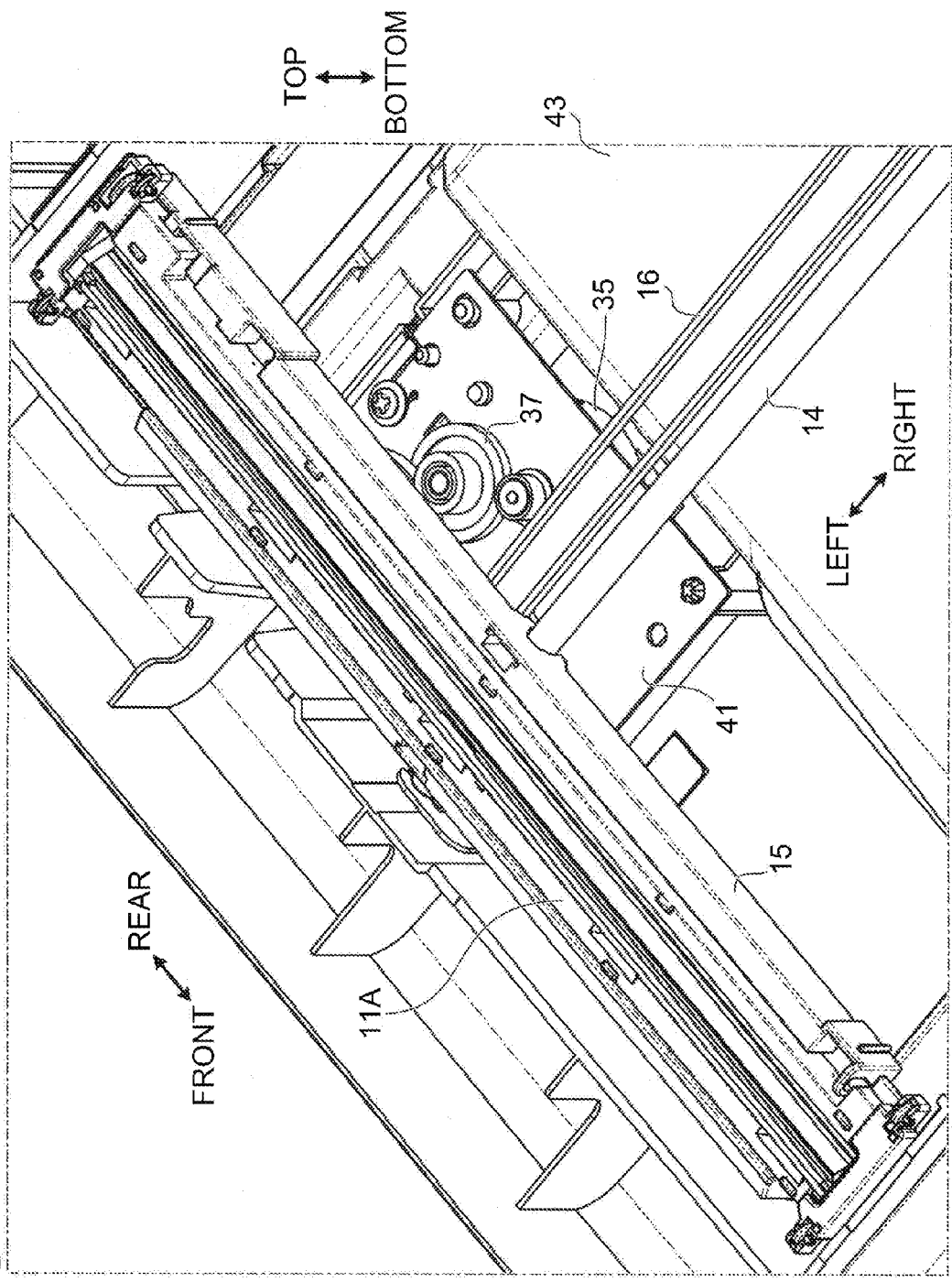
FIG. 4 is a perspective view illustrating an internal configuration of a flatbed unit in the first illustrative embodiment according to one or more aspects of the disclosure.

As illustrated in FIG. 3, the FB unit 3A includes a motor 35, a decelerator 37, and pulleys 39A and 39B as well as the first image sensor 11A, the guide shaft 14, the carriage 15, and the toothed belt 16. The motor 35, the decelerator 37, and the pulley 39A are attached to a frame 41 (as an example of a metal plate member) made of a metal plate. As illustrated in FIGS. 3 and 4, the frame 41 is attached to a base 43 by screws or by insertion thereinto. The base 43 may be molded from resin. The first image sensor 11A, the guide shaft 14, the carriage 15, the toothed belt 16, the motor 35, the decelerator 37, and the pulleys 39A and 39B are accommodated in a space defined between the base 43 and the FB platen 12.

The motor 35 is a power source that is configured to generate power for driving the carriage 15. In the first illustrative embodiment, the motor 35 may be a stepping motor. The decelerator 37 is a power transmission mechanism for transmitting power from the motor 35 to the pulley 39A. The decelerator 37 includes a plurality of gears. The pulleys 39A and 39B are each configured to rotate, and are spaced from each other in the sub-scanning direction (e.g., the right-left direction in FIG. 3). The pulley 39A is driven to rotate by power transmitted from the motor 35 via the decelerator 37.

The toothed belt 16 may be an endless belt. The toothed belt 16 is looped around the pulleys 39A and 39B to extend therebetween. The toothed belt 16 is positioned opposite to the FB platen 12 across the space in which the carriage 15 reciprocates. The toothed belt 16 is driven to rotate by power transmitted from the pulley 39A. The pulley 39B is driven to rotate by rotation of the toothed belt 16. The toothed belt 16 is driven by the motor 35 to rotate in a forward direction or in a reverse direction. In accordance with rotation of the toothed belt 16 in the forward direction or in the reverse direction, the carriage 15 reciprocates in the right-left direction.

Figure 5:
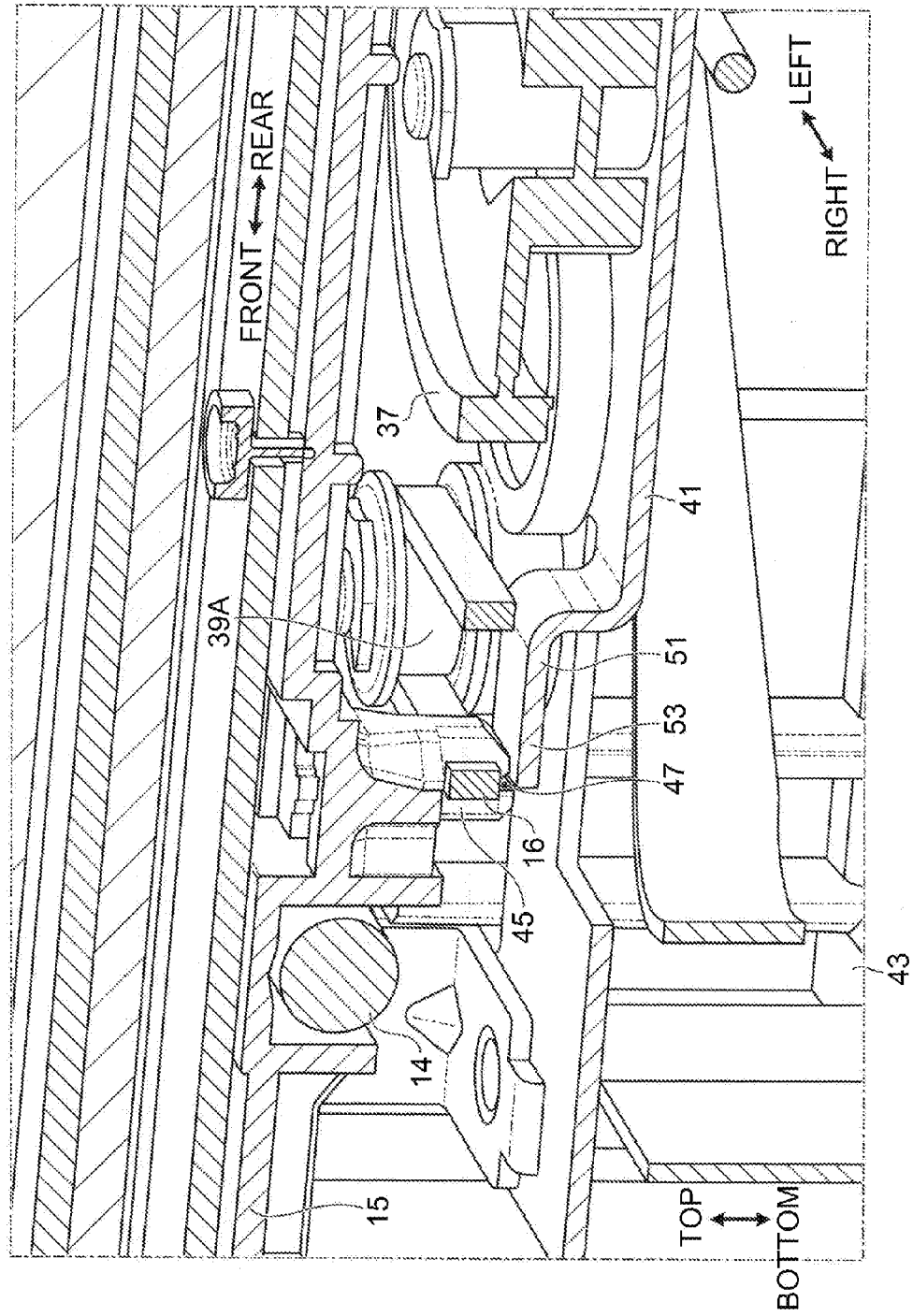
FIG. 5 is a perspective view illustrating a restricting member and its surrounding components in the first illustrative embodiment according to one or more aspects of the disclosure.

As illustrated in FIGS. 3 and 5, the carriage 15 includes a connector 45. As illustrated in FIG. 5, the connector 45 protrudes toward the toothed belt 16 from a lower surface of the carriage 15. The connector 45 has an entry port 47 at a distal end thereof. The entry port 47 may enable insertion of a portion of the toothed belt 16 into the inside of the connector 45. In a state where a portion of the toothed belt 16 has been inserted in the inside of the connector 45 through the entry port 47, the connector 45 is connected to the toothed belt 16 by pinching the portion of the toothed belt 16 from both sides of the toothed belt 16 in the main scanning direction. In response to rotation of the toothed belt 16, the connector 45 and the carriage 15 move with the toothed belt 16.

As illustrated in FIGS. 3 and 5, the frame 41 includes a restricting member 51. The restricting member 51 is disposed outside the FB platen 12 and between the pulleys 39A and 39B in the sub-scanning direction. In the first illustrative embodiment, the restricting member 51 may be a bent portion of the frame 41 that may be raised during press forming of the frame 41. The restricting member 51 includes a plate-shaped portion 53. The plate-shaped portion 53 has a thickness in a direction orthogonal to the main scanning direction and the sub-scanning direction (i.e., the plate-shaped portion 53 has a thickness in the top-bottom direction in the first illustrative embodiment). Hereinafter, the direction of the thickness of the plate-shaped portion 53 is referred to as a thickness direction. The plate-shaped portion 53 is disposed at such a position as to face or oppose the connector 45 when the carriage 15 is located at the first position (i.e., at the standby position).

With this configuration, if the connected portion of the toothed belt 16 moves in a direction in which the toothed belt 16 tends to disengage from the connector 45 (e.g., downward in the first illustrative embodiment) when the carriage 15 is located at the standby position, the plate-shaped portion 53 contacts, at its surface extending orthogonal to the thickness direction, a sagging portion of the toothed belt 16. The plate-shaped portion 53 thus restricts further displacement of the toothed belt 16 in the direction in which the toothed belt 16 tends to disengage from the connector 45.

In the state where the carriage 15 is at the standby position, the restricting member 51 is shaped and positioned relative to the toothed belt 16 such that the toothed belt 16 is not disengaged from the connector 45 before the restricting member 51 contacts the toothed belt 16. When the carriage 15 reciprocates as the toothed belt 16 rotates, the restricting member 51 is positioned so as not to interfere with the connector 45 and the toothed belt 16.

In the state where the carriage 15 is at the standby position, the restricting member 51 is shaped and positioned relative to the belt 16 such that the belt 16 is not disengaged from the connector 45 before the restricting member 51 contacts the belt 16. When the carriage 15 reciprocates as the belt 16 rotates, the restricting member 51 is positioned so as not to interfere with the connector 45 and the belt 16.

[Effects]

While the carriage 15 is located at the standby position, displacement of the toothed belt 16 in the direction in which the toothed belt 16 tends to disengage from the connector 45 may occur due to, for example, impact or shock to the multifunction device 1. According to the multifunction device 1 of the first illustrative embodiment, the restricting member 51 contacts the sagging portion of the toothed belt 16 if such displacement occurs. Thus, the restricting member 51 restricts further displacement of the toothed belt 16 in the direction in which the toothed belt 16 tends to disengage from the connector 45. Therefore, this configuration may restrict disengagement of the toothed belt 16 from the connector 45.

In particular, in the first illustrative embodiment, if the connected portion of the toothed belt 16 held by the connector 45 moves in the direction in which the toothed belt 16 tends to disengage from the connector 45 through the entry port 47, the restricting member 51 contacts the sagging portion of the toothed belt 16. Therefore, this configuration may restrict disengagement of the toothed belt 16 from the connector 45 having the entry port 47 at the distal end thereof.

In the first illustrative embodiment, the plate-shaped portion 53 of the restricting member 51 contacts, at its surface extending orthogonal to the thickness direction, the sagging portion of the toothed belt 15. That is, a surface having a larger area among the surfaces of the plate-shaped portion 53 (e.g., an upper surface having a larger area than end surfaces of the plate-shaped portion 53) contacts the sagging portion of the toothed belt 16. This may further restrict disengagement of the toothed belt 16 from the connector 45.

In the first illustrative embodiment, the plate-shaped portion 53 may be a portion of the metal plate member to which the motor 35 is attached. Therefore, no component needs to be prepared as the restricting member 51 separately from the metal plate member. Thus, the configuration of the multifunction device 1 may be simplified accordingly.

In the first illustrative embodiment, the restricting member 51 is disposed at such a position as to face the connector 45 when the carriage 15 is located at the first position. Therefore, if the connected portion of the toothed belt 16 tends to disengage from the connector 45, the restricting member 51 may directly contact the sagging portion of the toothed belt 16 to restrict disengagement of the toothed belt 16 from the connector 45.

(2) Second Illustrative Embodiment

Hereinafter, a second illustrative embodiment will be described. An explanation will be given mainly for the components different from the first illustrative embodiment, and an explanation will be omitted for the common components by assigning the same reference numerals thereto.

[Detailed Configuration of Restricting Member and its Surrounding Components]

Figure 6:
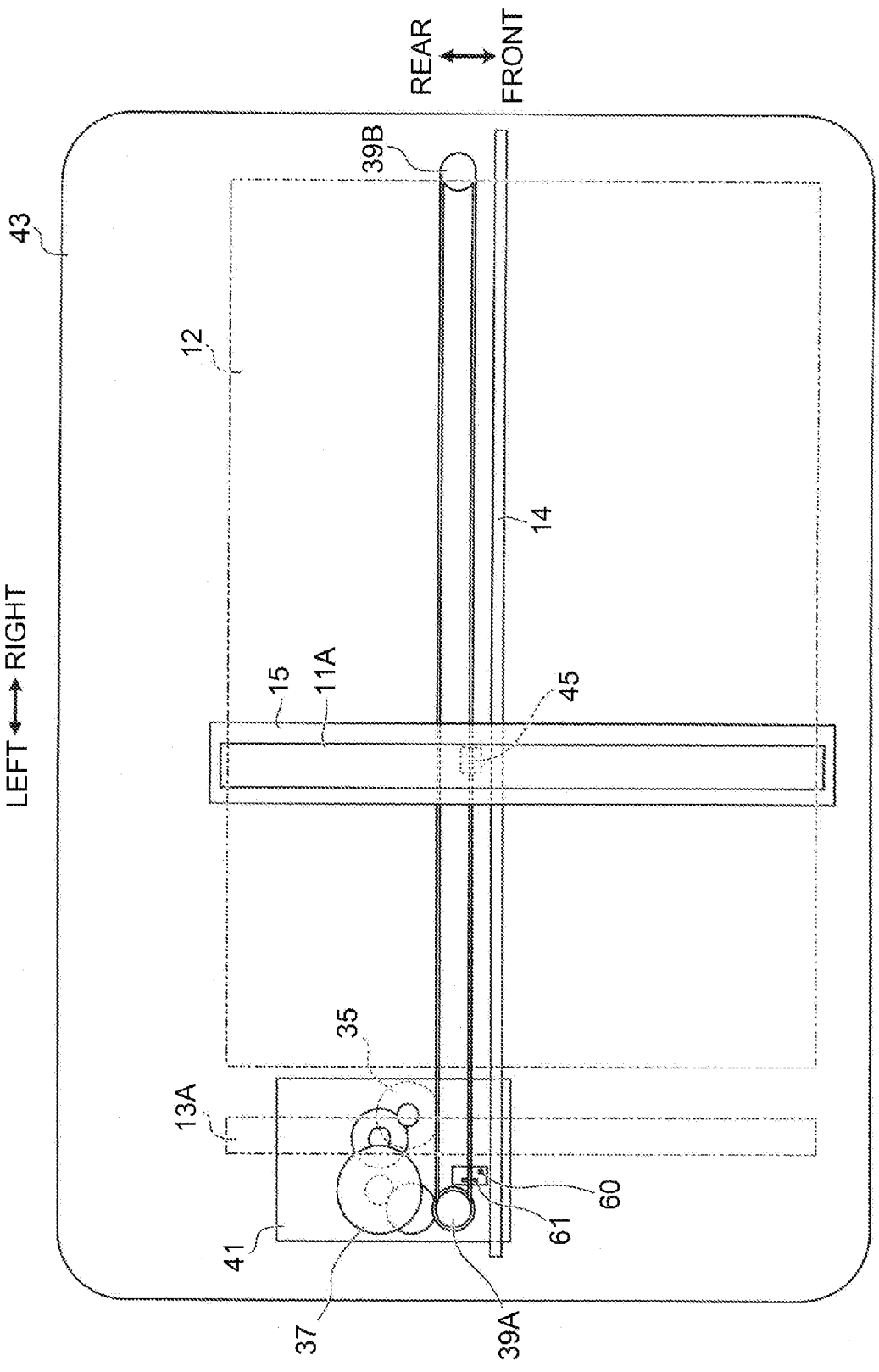
FIG. 6 is a schematic top plan view illustrating a scanner in a second illustrative embodiment according to one or more aspects of the disclosure.
Figure 7:
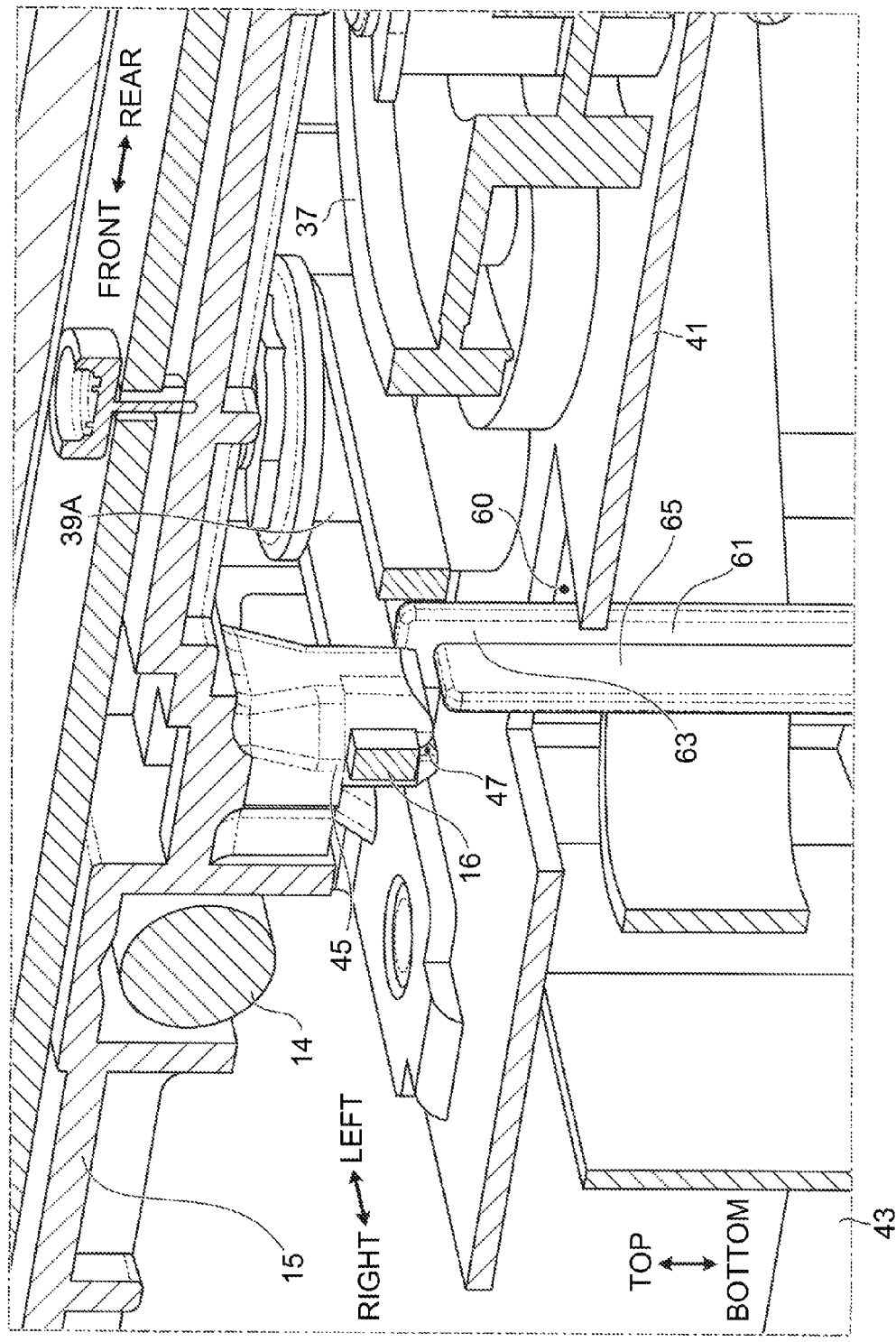
FIG. 7 is a perspective view illustrating a restricting member and its surrounding components in the second illustrative embodiment according to one or more aspects of the disclosure.

A restricting member according to the second illustrative embodiment has a different configuration from the restricting member 51 according to the first illustrative embodiment. More specifically, as illustrated in FIGS. 6 and 7, the frame 41 has a through hole 60 and a restricting member 61 is disposed through the through hole 60. The restricting member 61 and the base 43 may be integrally molded from resin. That is, the restricting member 51 according to the first illustrative embodiment is integral with the frame 41, whereas the restricting member 61 according to the second illustrative embodiment is integral with the base 43.

In the first illustrative embodiment, the upper surface of the restricting member 51 faces the connector 45 when the carriage 15 is located at the standby position. In the second illustrative embodiment, however, the restricting member 61 is located closer to the pulley 39A than the restricting member 51 of the first illustrative embodiment. In the second illustrative embodiment, the restricting member 61 is situated such that, when the carriage 15 is located at the standby position, an upper end (e.g., a distal end) of the restricting member 61 faces a portion of the toothed belt 16 between the connector 45 and the pulley 39A.

The restricting member 61 includes a plate-shaped portion 63 having a thickness in a direction corresponding to the sub-scanning direction. The plate-shaped portion 63 has an end surface (e.g., an upper end surface) extending in the main scanning direction. If a portion of the toothed belt 16 moves in the direction in which the toothed belt 16 tends to disengage from the connector 45 when the carriage 15 is located at the standby position, the end surface of the plate-shaped portion 63 contacts the sagging portion of the toothed belt 16. The restricting member 61 includes a reinforcing portion 65 having a thickness in a direction corresponding to the main scanning direction. The reinforcing portion 65 is integral, at its one end in the sub-scanning direction, with the plate-shaped portion 63. Thus, the plate-shaped portion 63 and the reinforcing portion 65 have a substantially T-shape in cross section which is parallel to both the main scanning direction and the sub-scanning direction.

[Effects]

In the second illustrative embodiment, if the toothed belt 16 moves in the direction in which the toothed belt 16 tends to disengage from the connector 45 when the carriage 15 is located at the standby position, the restricting member 61 contacts the sagging portion of the toothed belt 16 as with the first illustrative embodiment. That is, the restricting member 61 restricts further displacement of the toothed belt 16 in the direction in which the toothed belt 16 tends to disengage from the connector 45, and therefore, this configuration may restrict disengagement of the toothed belt 16 from the connector 45.

In the second illustrative embodiment, the restricting member 63 contacts, at its end surface extending in the main scanning direction, the sagging portion of the toothed belt 63. Therefore, such an end surface may reliably restrict disengagement of the toothed belt 16 from the connector 45 by contacting the sagging portion of the toothed belt 16 as compared with a case where the thickness direction of the plate-shaped portion 63 corresponds to the sub-scanning direction.

The restricting member 61 includes the reinforcing portion 65. Therefore, the plate-shaped portion 63 may have a higher flexural rigidity and an improved mechanical strength as compared with a case where the restricting member 61 does not have such a reinforcing portion. Although the plate-shaped portion 63 and the base 43 are integrally molded from resin, the reinforcing portion 65 enables the restricting member 61 to have a higher flexural rigidity.

The plate-shaped portion 63 may be a portion of the base 43. Therefore, no component needs to be prepared as the restricting member 61 separately from the base 43. Thus, the configuration of the multifunction device 1 may be simplified accordingly.

The restricting member 61 is disposed at such a position as to face or oppose a portion of the toothed belt 16. The portion of the toothed belt 16 is between the connector 45 and the pulley 39A. With this configuration, the restricting member 61 and the connector 45 do not contact with each other while the carriage 15 moves between the first position and the second position. Therefore, the restricting member 61 may be disposed in vicinity of the toothed belt 16 without any consideration given to interference between the connector 45 and the restricting member 61.

(3) Alternative Embodiments

While the disclosure has been described in detail with reference to the specific embodiments thereof, these are merely examples, and various changes, arrangements and modifications may be applied therein without departing from the spirit and scope of the disclosure.

In the first illustrative embodiment, the restricting member 51 is a portion of the metal plate member (e.g., the frame 41). Nevertheless, in other embodiments, for example, a restricting member may be a portion of a resin component (e.g., the base 43) as with the second illustrative embodiment and such a restricting member may have a contact surface having a similar shape to the contact surface (e.g., the upper surface) of the restricting member 51 of the first illustrative embodiment. In the second illustrative embodiment, the restricting member 61 is a portion of the resin component (e.g., the base 43). Nevertheless, in other embodiments, for example, a restricting member may be a portion of the metal plate member (e.g., the frame 41) as with the first illustrative embodiment and such a restricting member may have a contact surface having a similar shape to the contact surface (e.g., the end surface) of the restricting member 61 of the second illustrative embodiment.

In other embodiments, for example, a predetermined function implemented by a single element in each of the illustrative embodiments may be implemented by cooperation of a plurality of elements. In other embodiments, for example, functions implemented by respective elements or a predetermined function implemented by cooperation of a plurality of elements in each of the illustrative embodiments may be implemented by a single element. In other embodiments, for example, the configuration according to each of the illustrative embodiments may be partially omitted. The configuration according to one of the illustrative embodiment may be partially added to or replaced with the configuration according to the other of the illustrative embodiments.

In the illustrative embodiments, the disclosure has been applied, as an example, to the multifunction device 1 including the configuration corresponding to the image scanner. Nevertheless, the disclosure may be implemented in various manners, and the disclosure may be applied to other devices, for example, a flatbed image scanner having a single function, or a system including the image scanner according to the illustrative embodiments.

What is claimed is:

1. An image scanner comprising:
   a support having a support surface configured to support thereon an object to be scanned;
   an image sensor configured to scan the object and including a plurality of scanning elements arrayed in a main scanning direction;
   a carriage carrying the image sensor thereon and configured to reciprocate under the support in a sub-scanning direction orthogonal to the main scanning direction and stand by at a standby position before and after the image sensor scans the object, the standby position being outside the support surface in the sub-scanning direction;
   a motor;
   a pair of pulleys spaced apart from each other in the sub-scanning direction, each pulley being rotatable, and one of the pulleys being configured to be driven to rotate by a driving force transmitted from the motor;
   a belt looped around the pulleys and configured to be driven to rotate by the driving force transmitted from the one of the pulleys;
   a base defining, between itself and the support, an accommodating space in which the image sensor, the carriage, the motor, the pulleys, and the belt are accommodated;
   a connector protruding from the carriage in a direction away from the support, and connected to the belt, and configured to, when the belt is driven to rotate, move with the belt and move the carriage, the connector having, at a protruding end thereof, an entry port and pinching opposite sides in the main scanning direction of the belt inserted in the entry port; and
   a restricting member disposed at the base to be closer to the connector when the carriage is at the standby position than when the carriage is under the support surface, the restricting member being configured to, when the carriage is at the standby position, restrict disengagement of the belt from the connector through the entry port by contacting the belt if the belt shifts in a disengaging direction in which the belt tends to disengage from the connector.

2. The image scanner according to claim 1, wherein the restricting member includes a plate-shaped portion having a thickness in a thickness direction orthogonal to the main scanning direction and the sub-scanning direction, the plate-shaped portion being configured to contact, at a surface thereof extending orthogonal to the thickness direction, the belt shifted in the disengaging direction when the carriage is at the standby position.

3. The image scanner according to claim 2, further comprising a metal plate member which is disposed at the base and to which the motor is attached, the plate-shaped portion being a part of the metal plate member.

4. The image scanner according to claim 1, wherein the restricting member includes a plate-shaped portion having a thickness in the sub-scanning direction, the plate-shaped portion being configured to contact, at an end surface thereof extending in the main scanning direction, the belt shifted in the disengaging direction when the carriage is at the standby position.

5. The image scanner according to claim 4, wherein the restricting member includes a reinforcing portion which has a thickness in the main scanning direction and is integral, at an end thereof in the sub-scanning direction, with the plate-shaped portion, the plate-shaped portion and the reinforcing portion having a substantially T-shaped cross section which is parallel to the main scanning direction and the sub-scanning direction.

6. The image scanner according to claim 4, wherein the base is molded from resin, and the plate-shaped portion is molded from resin integrally with the base.

7. The image scanner according to claim 1, wherein when the carriage is at the standby position, the restricting member is immediately below a portion of the belt, the portion being between the connector and the one of the pulleys.

8. The image scanner according to claim 1, wherein when the carriage is at the standby position, the restricting member is immediately below the entry port of the connector.

9. The image scanner according to claim 1, wherein the restricting member is disposed between the pulleys and outside the support surface of the support in the sub-scanning direction.

10. An image scanner comprising:
- a support having a support surface configured to support thereon an object to be scanned;
- an image sensor configured to scan the object and including a plurality of scanning elements arrayed in a main scanning direction;
- a carriage carrying the image sensor thereon and configured to reciprocate under the support in a sub-scanning direction orthogonal to the main scanning direction and stand by at a standby position before and after the image sensor scans the object, the standby position being outside the support surface in the sub-scanning direction;
- a motor;
- a pair of pulleys spaced apart from each other in the sub-scanning direction, each pulley being rotatable, and one of the pulleys being configured to be driven to rotate by a driving force transmitted from the motor;
- a belt looped around the pulleys and configured to be driven to rotate by the driving force transmitted from the one of the pulleys;
- a base defining, between itself and the support, an accommodating space in which the image sensor, the carriage, the motor, the pulleys, and the belt are accommodated;
- a connector protruding from the carriage in a direction away from the support and connected to the belt, and configured to, when the belt is driven to rotate, move with the belt and move the carriage, the connector having, at a protruding end thereof, an entry port and pinching opposite sides in the main scanning direction of the belt inserted in the entry port; and
- a restricting member disposed at the base and configured to:
  - when the carriage is at the standby position, be immediately below the entry port of the connector and stop the belt from disengaging from the connector through the entry port; and
  - when the carriage is under the support surface, not be immediately below the entry port of the connector.

* * * * *

UNITED STATES PATENT AND TRADEMARK OFFICE
CERTIFICATE OF CORRECTION

PATENT NO.          : 9,948,800 B2
APPLICATION NO.     : 15/437061
DATED               : April 17, 2018
INVENTOR(S)         : Hiroaki Shigeno Page 1 of 1

It is certified that error appears in the above-identified patent and that said Letters Patent is hereby corrected as shown below:

In the Claims

Claim 1:
Column 10, Line 34: Delete "the support, and" and insert -- the support and -- therefor.

Signed and Sealed this
Twenty-third Day of October, 2018

Andrei Iancu
*Director of the United States Patent and Trademark Office*